April 20, 1965 B. G. KING 3,179,889

TIMING OF PULSE TRANSMISSION SYSTEMS BY INTERSPERSED OPPOSITE-POLARITY PULSES

Filed Oct. 2, 1962

INVENTOR
B. G. KING

BY Harry C. Hart
ATTORNEY

United States Patent Office 3,179,889
Patented Apr. 20, 1965

3,179,889

TIMING OF PULSE TRANSMISSION SYSTEMS BY INTERSPERSED OPPOSITE-POLARITY PULSES

Bernard G. King, Morristown, N.J., assignor to Bell Telephone Laboratories, Incorporated, New York, N.Y., a corporation of New York Filed Oct. 2, 1962, Ser. No. 227,945
5 Claims. (Cl. 325—38)

Figure 1:
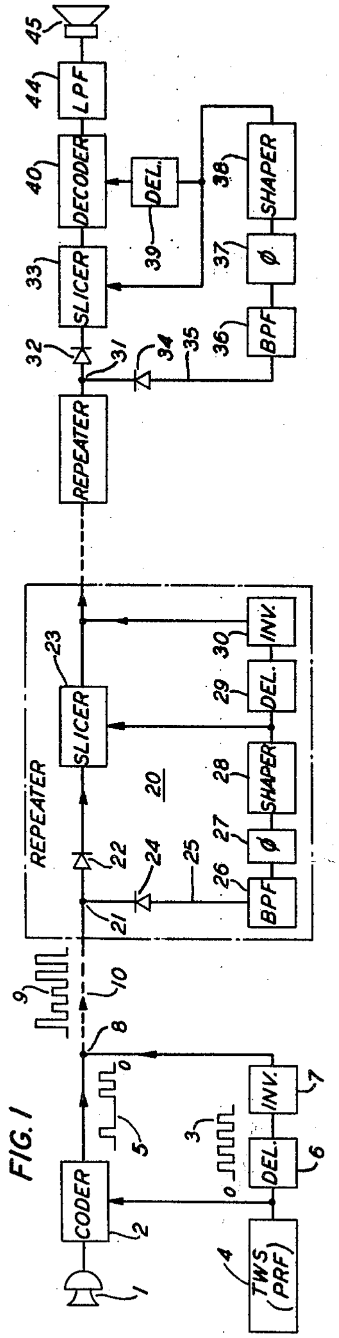

This invention is concerned with the transmission of information by pulse techniques. Its object is to improve the accuracy and certainty with which information-bearing pulses are regenerated after they have been degraded in the course of transmission.

In the transmission of information, a major advantage offered by pulse techniques, and especially pulse code techniques, is that a train of information-bearing pulses which have been degraded, as by accretion of noise, in the course of transmission, can be fully regenerated, provided only that the degradation has not gone too far. This has led to the development of pulse transmission systems which, by the interposition of regenerators at suitable intervals, are substantially immune to normal amounts of noise.

Because noise can alter the phase of a pulse as well as its amplitude, correct regeneration of information-bearing pulses requires not only that their amplitudes be standardized but also that they be correctly located on the time scale—if necessary, relocated; i.e., that they be "retimed." To control the retiming operation, a timing wave is necessary. To avoid the consequences of differences of propagation times as between different channels or transmission media, the timing wave is advantageously transmitted over the same medium as the information-bearing wave. At each repeater station and finally at the receiver station the two waves must then be somehow segregated, one from the other, the information wave being supplied to the regenerator as an input wave, and the timing wave being applied to it as a control signal.

Past proposals for effecting the required segregation are open to certain criticisms. Thus, when the "baseband" component—the component of fundamental pulse repetition frequency—of the information-bearing wave itself is relied on as a timing wave as, for example, in Kreer-Peterson Patent 2,527,638, its amplitude changes from time to time, in dependence on the character of the message being transmitted, and sometimes falls to such a low level as to be substantially unrecognizable. When, to prevent this eventuality, a timing wave of baseband frequency is deliberately added to the information-bearing wave as proposed, for example, in Andrews-Sumner Patent 2,992,341, its amplitude must be at all times held well below the amplitude of the information-bearing wave and, even so, its presence diminishes the discrimination of the system against noise.

According to the present invention a train of information-bearing pulses of one polarity is accompanied by a train of timing or "clock" pulses of opposite polarity, the pulses of the second train being interspersed among those of the first train in such a way as not to interfere with them; i.e., the timing pulses occur between adjacent information pulse positions, not in those positions. In the simplest illustration, in which the repetition rate of the timing pulses is equal to the baseband frequency of the system, a timing pulse occurs in every interpulse position. After transmission of the resulting composite pulse train to a pulse regenerator, whether at the final receiver station or at an intermediate repeater station, it is readily broken down into its constituent parts on the basis of polarity alone. Thus, a first unilaterally conducting device, such as a routing diode or the equivalent, acts to send all the pulses of the first polarity into an information processing path while another routing diode, oppositely poled, directs all the pulses of the opposite polarity into a control path. There, after filtering, phasing and shaping, each of them controls the retiming of one of the information pulses. The retiming having been accomplished, the control pulses are shifted on the time scale to fall between adjacent information pulse positions, polarized oppositely to the regenerated information pulses of the outgoing train and combined with them to form a composite train, as before.

According to a refinement by which bandwidth is to some extent economized, the repetition rate of the timing pulses is a submultiple, e.g., one half, one tenth, one $n$th, of the baseband frequency. In this case, after polarity segregation by the routing diodes, a control wave is developed from the transmitted component by frequency multiplication by the corresponding factor, e.g., two, ten, $n$.

Figure 2:
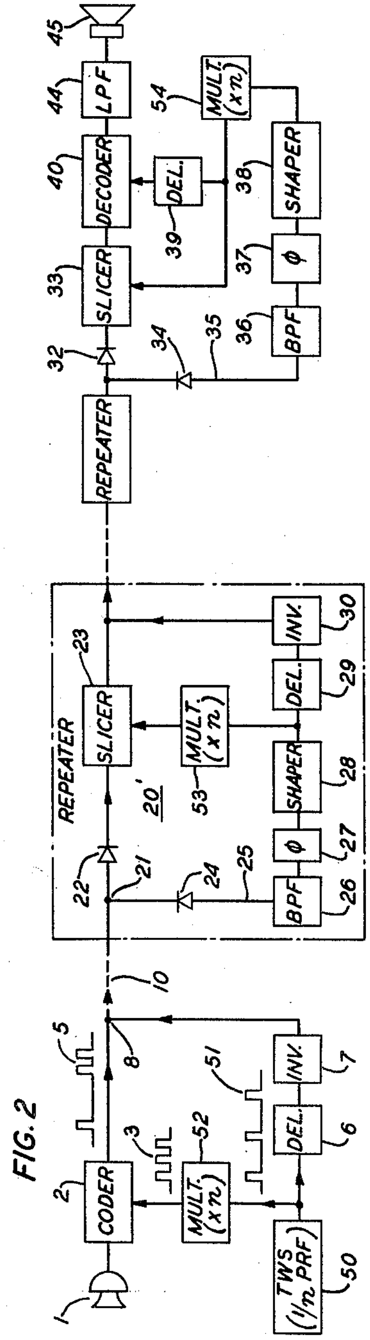

The invention will be readily apprehended from the following detailed description of illustrative embodiments thereof, taken in connection with the appended drawings in which:

FIG. 1 is a block schematic diagram showing a pulse transmission system embodying the invention; and FIG. 2 is a block schematic diagram showing a variant of the system of FIG. 1.

Referring now to FIG. 1, a message wave originating in a source such as a microphone 1 is translated into pulse code form by a coder 2. The operations of the coder are controlled by "clock" pulses 3, originating in a timing wave source 4, which recur regularly on the time scale and hence define "time slots" or "pulse positions" in which, and only in which, the outgoing information-bearing pulses 5 delivered by the coder 2 can occur. In accordance with the invention the clock pulses of the timing wave source 4 are retarded on the time scale by a delay device 6, inverted in polarity by an inverter 7 and then combined at a terminal 8 with the information-bearing pulses 5 for transmission, as a composite bipolar pulse train 9, over a common medium 10, either directly to a reciever station or to an intermediate repeater station. Given that the information-bearing pulses at the output terminal of the coder 2 are of positive polarities, the outgoing timing pulses are of negative polarities. The inverter 7 is included for illustrative purposes on the postulate that the clock pulses initially delivered by the timing wave source 4 are of positive polarity as is usual for the control of a coder that delivers positive pulses. If the coder is constructed to deliver positive information pulses in response to negative timing pulses delivered by the timing wave source, the inverter 7 may be omitted. The delay device 6 interposes a retardation of one half of an interpulse interval, increased by any delay incidental to the operations of the coder 2. Thus, in the outgoing composite pulse train 9, the negative timing pulses occur between adjacent pulse positions or time slots in which the positive information-bearing pulses occur.

The resulting composite bipolar pulse train 9, after transmission over the common medium 10, is normally degraded by accretion of noise and hence regeneration is usually called for. The composite pulse train thus reaches the input terminal 21 of a regenerator which be located at a repeater station 20. Here, a first diode 22, poled to accept only positive pulses, passes the positive information-bearing pulses to a slicer 23 while a second diode 24, poled to accept only negative pulses, passes the negative timing pulses into a control path 25. In the control path 25 sporadic variations of phase or "jitter" of the timing pulses, due to accretion of noise, are removed by a band-pass filter 26 tuned to the frequency of the timing wave source 4. A phase shifter 27 delays the resulting wave by an appropriate amount and each single cycle of this wave is converted into a control pulse by a shaper 28. The retardation introduced by the phase shifter 27 is such that each control pulse reaches the control terminal of the slicer 23 at the midpoint of the time slot in which an information-bearing pulse, if present, reaches the input terminal of the slicer 23. The slicer 23 acts to standardize the amplitudes of the information pulses while the timing pulses applied to its control terminal act to regularize the outgoing standardized information pulses on the time scale. The output wave of the slicer 23 is thus a fully regenerated replica of the output wave of the coder.

Because a number of repeater stations, of which one is shown and another is indicated, are normally required in tandem, the information pulse train outgoing from each repeater station is supplemented by a train of timing pulses for control of the timing operations at the next repeater station. To this end the pulses developed for control of the slicer 23 are appropriately retarded on the time scale by a delay device 29 and brought to polarity opposite to the polarity of the information-bearing pulses by an inverter 30 and, then, additively combined with the outgoing information-bearing pulses to form a composite bipolar pulse train identical with that appearing at the output terminal 8 of the transmitter station.

The composite pulse train, after regeneration in the fashion described above, now reaches a receiver station at the input terminal 31 of which positive pulses are applied through a routing diode 32 and through a slicer 33 to a decoder 40 while negative pulses are applied through another routing diode 34, oppositely poled, to a control path 35. Like the control path 25 of the repeater 20, this control path comprises a bandpass filter 36, a phase shifter 37 and a shaper 38 interconnected in tandem, in the order named. The control pulses appearing at the output terminal of the shaper 38 serve to control the operations of the slicer 33 as in the case of the regenerator described above, and also the operations of the decoder 40 which translates each code group of incoming information-bearing pulses, applied to its input terminal, into a corresponding amplitude sample. After smoothing by a filter 44, this train of amplitude samples is applied to a reproducer 45 in conventional fashion. Inevitable lags between the operations of the slicer 33 and those of the decoder 40 are compensated by a delay pad 39.

Employment of timing pulses of polarity opposite to the polarity of the information-bearing pulses permits the separation of the two constituent trains of which the transmitted composite train is composed on the basis of polarity alone by the use of components of the simplest kind, namely, routing diodes. Arrangement of the timing pulses on the time scale between the information time slots, instead of in those time slots, prevents interference between timing pulses and information pulses and thus preserves the high discrimination afforded against noise by the technique of pulse code transmission.

These advantages, however, are purchased at the price of some increase in the transmission bandwidth required of the medium for the composite pulse train 9 as compared with the bandwidth which would be required for the information-bearing pulse train 5 alone. It is a feature of the invention that the additional bandwidth thus required is reduced by use of a timing pulse train of which the pulse repetition rate is equal, not to the baseband frequency itself, but to a submultiple of it; e.g., one half, one tenth, one *n*th of it. FIG. 2, otherwise like FIG. 1, shows a system embodying this feature. The timing wave source 50 delivers pulses 51 at this submultiple rate. Each of them is delayed by one half of an interpulse interval and brought to a polarity opposite to the polarity of the information pulses and combined with the outgoing information pulse train, as before, and by the action of similarly numbered elements. Now, however, to provide control of the operations of the coder 2, a frequency multiplier 52 is included in the coder control path to deliver a control pulse for each time slot. The same is true in the repeater 20' and at the receiver station, frequency multipliers 53, 54 being shown in each case for the purpose. Thus, so far as affects the coder 2 at the transmitter station, the slicer 23 in the repeater station and the slicer 33 and decoder 40 at the receiver station, the control pulses recur at the baseband frequency while, on the transmission medium 10 they recur at a much lower frequency, though with the same degree of regularity, and hence require less additional bandwidth for transmission.

Each of the frequency multipliers 52, 53, 54 may be conventional and may include a reactive circuit or element such as a piezoelectric crystal which, when shock-excited by one of the transmitted timing wave pulses as it arrives, rings at the basic pulse repetition rate, thus to deliver control pulses to the coder, the slicer, or the decoder at the rate at which they are required. Such reactive circuit or element can readily be constructed to maintain its output frequency to a high degree of precision and with only an insubstantial creep of the phase of its output over a period of ten or more cycles, at the end of which time it is ready to accept the next driving pulse without reacting in a transient fashion.

What is claimed is:

1. In a system for the transmission of information by pulse techniques,
   a source of a message wave,
   means for translating said message wave into a train of information-bearing pulses of a first polarity and a particular phase,
   means for generating a train of regularly recurrent timing pulses of opposite polarity and opposite phase,
   means for combining said trains to form a composite pulse train of which pulses of said one polarity carry the information of said message wave while pulses of said opposite polarity are interspersed among the pulses of said one polarity,
   means for transmitting said composite pulse train over a common medium to a regenerator station
   and, at said regenerator station
   an input terminal,
   an information path extending from said input terminal to an output terminal and including an amplitude standardizing element having a control terminal,
   a control path extending from said input terminal to said control terminal and including a smoothing element and a phase shifting element,
   a first unidirectionally conducting device for selectively routing incoming pulses of the first polarity into the information path,
   and a second unidirectionally conducting device for selectively routing incoming pulses of the opposite polarity into the control path.

2. In a pulse transmission system,
   apparatus for accepting an incoming train composed of information-bearing pulses of one polarity and,
   interspersed among said information-bearing pulses regularly recurrent timing pulses of opposite polarity which comprises,
   an input terminal,
   an information path extending from said input terminal to an output terminal,
   a first unidirectionally conducting device for selectively routing pulses of the first polarity into said information path,
   said information path including a pulse-retiming element having a control terminal,
   a control path extending from said input terminal to said control terminal and including a phase shifting element,
   and a second unidirectionally conducting device for selectively routing pulses of the opposite polarity into the control path, whereby the information pulses are retimed under control of the timing pulses.

3. In a pulse transmission system,
apparatus for accepting an incoming train composed of information-bearing pulses of one polarity and,
interspersed among said information-bearing pulses, regularly recurrent timing pulses of opposite polarity which comprises,
an input terminal,
an information path extending from said input terminal to an output terminal,
a first unidirectionally conducting device for selectively routing pulses of the first polarity into said information path,
said information path including an amplitude standardizing element having a control terminal,
a control path extending from said input terminal to said control terminal and including a smoothing element and a phase shifting element,
and a second unidirectionally conducting device for selectively routing pulses of the opposite polarity into the control path,
said phase shifting device being proportioned to apply control pulses to said control terminal in substantial time coincidence with the application of information-bearing pulses to said amplitude standardizing element.

4. In a pulse transmission system,
apparatus for accepting an incoming train composed of information-bearing pulses of one polarity and,
interspersed among said information-bearing pulses, regularly recurrent timing pulses of opposite polarity, which comprises
polarity-sensitive means for segregating the information-bearing pulses from the timing pulses, slicer means for standardizing the amplitudes of the information-bearing pulses,
means for retiming the amplitude-standardized information-bearing pulses under control of the segregated timing pulses to form a train of regenerated information-bearing pulses of one polarity,
and means for interspersing regular timing pulses of opposite polarity among said regenerated pulses.

5. In a pulse transmission system,
apparatus for accepting an incoming train composed of information-bearing pulses of one polarity, said pulses having a baseband frequency, and, interspersed among said information-bearing pulses, regularly recurrent timing pulses of opposite polarity, said timing pulses having a repetition rate equal to a submultiple of said baseband frequency, which comprises
polarity-sensitive means for segregating the information-bearing pulse train from the timing pulse train,
slicer means for standardizing the amplitudes of the information-bearing pulses,
means, including a frequency multiplier for developing from the submultiple frequency timing pulses a train of baseband frequency control pulses,
means for retiming the amplitude-standardized information-bearing pulses under control of the baseband frequency control pulses to form a train of regenerated information-bearing pulses of one polarity,
and means for interspersing regular timing pulses of opposite polarity and of said submultiple frequency among said regenerated pulses.

References Cited by the Examiner

UNITED STATES PATENTS 2,777,897 1/57 Gretener et al. ______ 325—38 XR

DAVID G. REDINBAUGH, *Primary Examiner.*